US009672396B1

(12) United States Patent
Bookman

(10) Patent No.: US 9,672,396 B1
(45) Date of Patent: Jun. 6, 2017

(54) RFID-ENABLED LIGHT BULB

(71) Applicant: Google Inc., Mountain View, CA (US)

(72) Inventor: Colin Bookman, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/004,213

(22) Filed: Jan. 22, 2016

(51) Int. Cl.
G06K 7/10 (2006.01)

(52) U.S. Cl.
CPC .................. G06K 7/10366 (2013.01)

(58) Field of Classification Search
CPC ............ G06K 7/0008; G06K 19/0723; G06K 7/10009; G06K 2017/0045; G06K 7/01; G06K 7/10356; G06K 7/10366; G06K 7/10039
USPC ........................................................ 340/10.3
See application file for complete search history.

(56) References Cited

U.S. PATENT DOCUMENTS

| 7,154,378 | B1 * | 12/2006 | Ertas | A61B 1/00059 340/309.16 |
| 7,976,461 | B2 * | 7/2011 | Ertas | A61B 1/00059 600/101 |
| 8,669,716 | B2 * | 3/2014 | Recker | H05B 37/0272 315/291 |
| 8,893,968 | B2 * | 11/2014 | Jonsson | G06Q 10/087 235/375 |
| 9,066,393 | B2 * | 6/2015 | Recker | H05B 33/0815 |
| 2009/0059603 | A1 | 3/2009 | Recker et al. | |
| 2011/0006898 | A1 | 1/2011 | Kruest et al. | |

* cited by examiner

Primary Examiner — Mark Blouin
(74) Attorney, Agent, or Firm — Fish & Richardson P.C.

(57) ABSTRACT

Methods, systems, and apparatus, including computer programs encoded on computer storage medium, to facilitate real-time inventory tracking using an RFID-enabled light bulb. In one aspect, an apparatus includes a device comprising a light bulb housing having a base with electrical contacts, a lighting element, an RFID reader module, and a network interface configured to provide a connection to a computer network. The apparatus may also include a processor and a data storage device storing instructions that are operable, when executed by a processor, to cause the processor to perform operations. The operations may include causing the RFID reader module to transmit interrogation signals, causing the RFID reader module to detect replies from multiple RFID tags, obtaining the information that uniquely identifies a particular RFID tag from each reply, and transmitting the obtained information over a wireless network connection using the wireless transceiver.

20 Claims, 6 Drawing Sheets

RFID-ENABLED LIGHT BULB

BACKGROUND

Retailers worldwide confront the problem of inventory tracking on a consistent basis. A variety of computer systems have been employed in an attempt to provide near real-time inventory tracking. However, such systems may be expensive and comprised of monolithic equipment that cannot be easily hidden from view. In addition, such systems may typically require a high degree of expertise to install and maintain the systems.

SUMMARY

According to at least one aspect of the subject matter disclosed by this specification, a method, system, and apparatus, including computer programs encoded on storage devices, are disclosed to facilitate real-time inventory tracking using an RFID-enabled light bulb. In some aspects, the subject matter in this specification may be embodied in a device that includes a light bulb housing having a base with electrical contacts for establishing an electrical connection in a light bulb socket, a lighting element, an RFID reader module comprising an antenna, a transmitter for generating RFID interrogation signals, a receiver for processing received replies to interrogation signals, and a network interface configured to provide a connection to a computer network. The apparatus may also include one or more processors, and one or more machine-readable storage devices storing instructions that, when executed by the one or more processors, cause the one or more processors to perform operations. The operations may include causing the RFID reader module to transmit interrogation signals, causing the RFID reader module to detect replies from multiple RFID tags that each include information that uniquely identifies a particular item associated with each respective RFID tag, obtaining the information that uniquely identifies a particular RFID tag from each reply, and transmitting the obtained information over the connection using the network interface.

These and other versions each may optionally include one or more of the following features. For instance, the RFID reader module, the network interface, the one or more processors, and the one or more machine-readable storage devices may each reside within the light bulb housing. In some implementations the RFID reader module may be assigned a device identifier that is stored in the one or more machine-readable storage devices.

In some aspects, the operations may further comprise associating the unique device identifier with the obtained information, and transmitting the obtained information and unique device identifier over the connection to the computer network using the network interface.

In other implementations, the device may also include a power conversion module to covert AC power received from a light bulb socket to DC power, wherein the operations may further comprise using the DC power output by the power conversion module to power the RFID reader, the network interface, the one or more processors, and the one or more machine-readable storage devices.

In yet other implementations, the lighting element may be oriented to direct light into a lighted region, wherein the antenna may be oriented to direct the interrogation signals to the lighted region and receive replies from the RFID tags located in the lighted region. Alternatively, or in addition, the antenna may direct interrogation signals to and receive replies from a conical region that spans a range of 35 to 45 degrees away from a central axis of the light bulb.

In other aspects, the operations may further comprise determining that a predetermined interval of time has expired, and in response to a determination that a predetermined interval of time has expired, causing the RFID module to transmit interrogation signals in response to the expiration of a predetermined interval of time.

In some implementations, transmitting the obtained information over a connection using the network interface may further include determining that a predetermined interval of time has expired, and in response to a determination that a predetermined interval of time has expired, causing the network interface to transmit the obtained information over the connection.

In some aspects, the obtained information that uniquely identifies a particular RFID tag from each reply may include an RFID tag identifier, a serial number, or a universal product code.

Other versions of the corresponding subject matter disclosed by this specification may include a system that includes one or more computers and one or more computer-readable storage devices storing instructions that, when executed by the one or more computers, cause the one or more computers to perform operations. The operations may include storing information that indicates locations of RFID readers. Additional operations may include receiving, over a computer network, a set of data from each of multiple RFID readers that are each integrated with a respective light bulb, wherein each set of data received from each of the multiple RFID readers includes (i) a device ID of the RFID reader, (ii) a timestamp, (iii) information that indicates a set of RFID tags detected by the RFID reader that was obtained by interrogating the RFID tags, accessing location data indicating locations corresponding to the RFID readers that are integrated with the respective light bulbs, and for one or more of the device IDs, determining the location of the RFID reader corresponding to the device ID based on the location data. The operations may further include determining, for one or more of the RFID tags, a location of the RFID tag based on the determined locations of one or more RFID readers that detected the RFID tag, and storing data indicating the location of the one or more RFID tags.

These and other versions each may optionally include one or more of the following features. For instance, one implementation may include operations for receiving a request for the location of a particular item over the computer network, and providing, based on the stored data indicating location of the one or more RFID tags, data indicating the location of the particular item. In addition, the operations may also include authenticating the received request for the location of a particular item prior to providing data indicating the location of the particular item.

In one implementation, the operations may further include receiving, over a computer network, multiple sets of data from a particular RFID reader, wherein the multiple sets of data were respectively transmitted by the RFID reader after each of a series of first predetermined time intervals, wherein each set of data includes (i) the device ID of the particular RFID reader, (ii) a timestamp for the set of data, and (iii) information that indicates a set of RFID tags detected by the RFID reader that was obtained by interrogating the RFID tags, aggregating the received multiple sets of data into an aggregated set of data, wherein the aggregation is initiated based upon the expiration of a second predetermined time interval that spans multiple first predetermined time intervals, updating a database of inventory items based on the aggregated set of data, and storing an inventory count for at least one item in the database of inventory items in response to the database update.

In other implementations, the operations further comprising receiving, over a computer network, multiple sets of data from multiple RFID readers that were transmitted by each RFID reader in accordance with the expiration of each of a plurality of first predetermined time intervals, wherein each set of data includes (i) a device ID of the RFID reader, (ii) a timestamp for the set of data, (iii) information that indicates a set of RFID tags detected by the RFID reader that was obtained by interrogating the RFID tags, aggregating, based on device ID of the RFID reader, the received multiple sets of data into a plurality of aggregated sets of data that are each associated with a particular RFID reader, wherein the aggregation is initiated based upon the expiration of a second predetermined time interval that spans multiple first predetermined time intervals, updating a database of inventory items based on each of the aggregated sets of data, and storing an inventory count for at least one item in the database of inventory items in response to the database update.

In some aspects, the operations may further comprise determining that two or more aggregated data sets generated in response to the expiration of the second predetermined time interval include the same information that identifies an RFID tag, and modifying the inventory count associated with the particular item that corresponds to the RFID tag in order to only count the particular item once.

In yet other implementations, receiving, over a computer network, the set of data from each of multiple RFID readers that are each integrated with a respective light bulb may further comprise receiving, over a computer network, a set of data from an RFID reader that is located within a base of a light bulb.

In some aspects, the information that information that indicates a set of RFID tags includes an RFID identifier for each RFID tag detected by an RFID reader.

DETAILED DESCRIPTION

Figure 1:
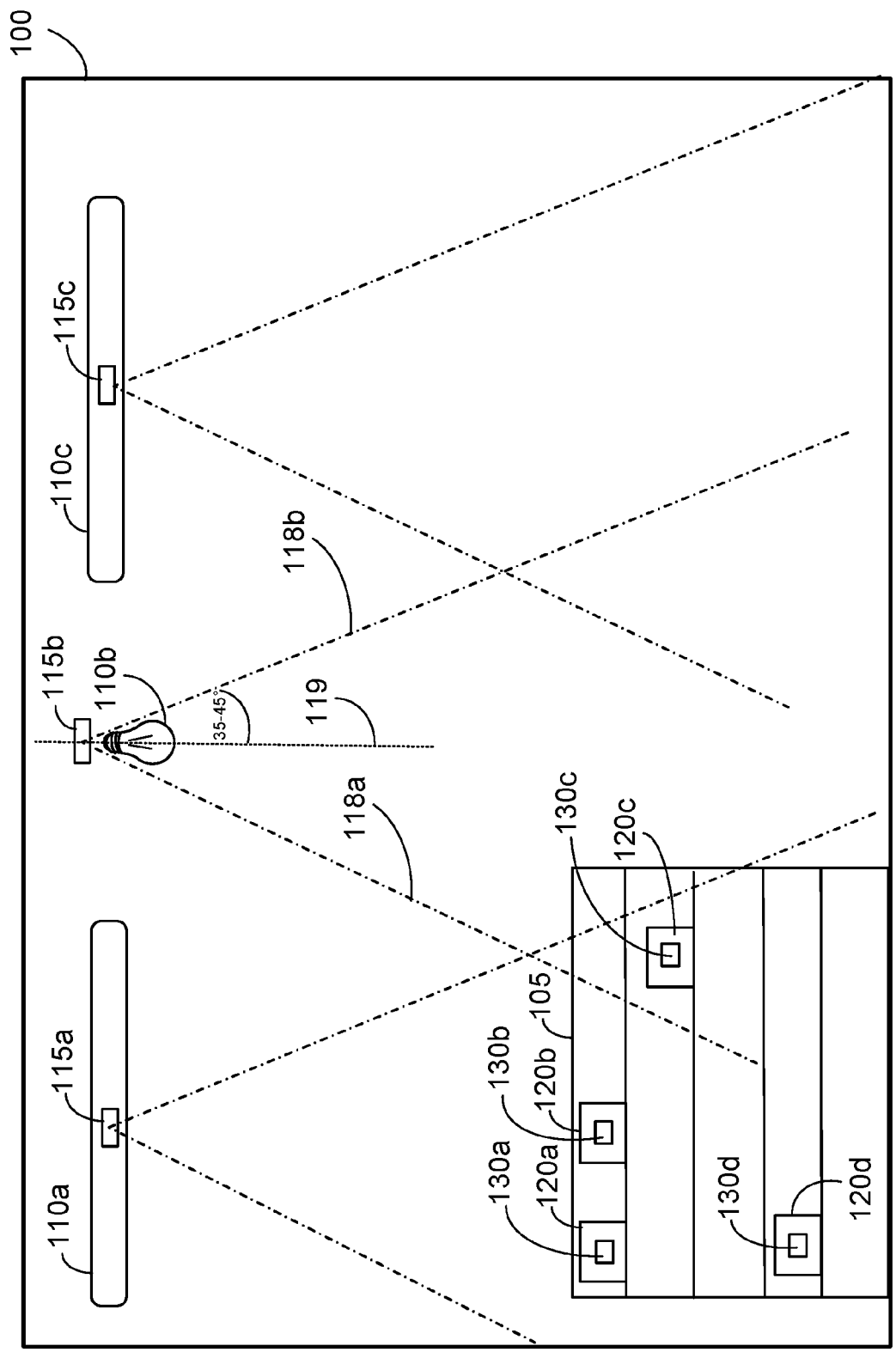
FIG. 1 is a contextual diagram showing features of an example of a system for tracking inventory in real-time using an RFID-enabled light bulb.

FIG. 1 is a contextual diagram showing features of an example of a system 100 for tracking inventory in real-time using an RFID-enabled light bulb 110a, 110b, 110c. The system 100 may include, for example, a display shelf 105, an RFID-enabled fluorescent light bulb 110a, an RFID-enabled incandescent light bulb 110b, an RFID-enabled LED light bulb 110c, a plurality of RFID readers 115a, 115b, 115c, a plurality of inventory items 120a, 120b, 120c, 120d, and a plurality of RFID tags 130a, 130b, 130c, 130d each attached to a different inventory item.

In general, RFID tracking can be performed using a set of small, independent RFID readers that are each associated with a separate light bulb. Components of the RFID reader can be integrated with the light bulb, for example, fixed to or located within a housing of the light bulb. As a result of this integration, simply installing the light bulb can position the integrated RFID reader over a desired area to be monitored, and the RFID reader can receive power through the light bulb's power connection. As discussed further below, each RFID-enabled light bulb may independently monitor nearby RFID tags and wirelessly transmit data associated with each monitored RFID tag to a server system. Installation of the RFID system can be done easily to use existing infrastructure, e.g., standard lighting sockets already existing in the buildings that may include RFID tags to be monitored. Also, the system is highly scalable, since the distributed nature of tracking allows the system to be easily adapted to different sizes of coverage areas by simply using more or fewer RFID-enabled light bulbs.

In one implementation, an RFID-enabled light bulb 110a, 110b, 110c may be utilized by, for example, a retailer as a component of system 100 in order to facilitate inventory tracking in real-time, or near real-time. For instance, a retailer may install multiple RFID-enabled light bulbs 110a, 110b, 110c. The RFID-enabled light bulbs 110a, 110b, 110c may serve a dual purpose. In one aspect, the RFID-enabled light bulbs 110a, 110b, 110c may provide light that is sufficient to illuminate one or more portions of a retailer's place of business. In addition, each of the RFID-enabled light bulbs 110a, 110b, 110c may be associated with a corresponding RFID reader 115a, 115b, 115c respectively.

Each RFID-enabled light bulb 110a, 110b, 110c may comprise a different type of light bulb. For instance, an RFID-enabled light bulb 110a, 110b, 110c may be a fluorescent light bulb 110a, an incandescent light bulb 110b, or an LED light bulb 110c. Each RFID-enabled lightbulb 110a, 110b, 110c may be associated with a variety of different bases. For example, an RFID-enabled light bulbs 110a, 110b, 110c may include a screw base, a twist and lock base, a BI pin base, a fluorescent pin base, a compact fluorescent pin base, a specialty base, or other types of bases. In some instances, each of the RFID-enabled light bulbs used by system 100 may be one of the aforementioned types of light bulbs, or another type of light bulb.

A retailer may set up a display shelf 105 that may include a plurality of inventory items 120a, 120b, 120c, 120d. Each of the inventory items may be associated with a respective RFID tag 130a, 130b, 130c, 130d. In one instance, each RFID tag 130a, 130b, 130c, 130d may be coupled directly to, or integrated within, each of the inventory items 120a, 120b, 120c, 120d, respectively. Alternatively, or in addition, each RFID tag 130a, 130b, 130c, 130d may be coupled to a price tag, or packaging, associated with each of the inventory items 120a, 120b, 120c, 120d. System 100 may use the RFID readers 115a, 115b, 115c that are integrated with each respective RFID-enabled light bulb 110a, 110b, 110c in order to obtain data associated with each RFID tags 130a, 130b, 130c, 130d. The data obtained from the RFID tags 130a, 130b, 130c, 130d may be used to update an inventory tracking database in real time. For instance, RFID readers 115a, 115b, 115c may transmit data obtained from each of the RFID tags 130a, 130b, 130c, 130d to a server over a network connection such as the Internet in order to update an inventory database associated with the retailer.

Each RFID reader 115a, 115b, 115c may be associated with an antenna that may transmit interrogation signals. The range within which these interrogation signals may be received may be referred to as an interrogation range 118a, 118b. The interrogation range may be directed based on the particular positioning of the RFID's reader's antenna. For instance, the RFID reader's antenna may be positioned in a way that directs interrogation signals in the same directions as the light that is emitted from the RFID-enabled light bulb. Accordingly, the range of interrogation may be substantially similar to the lighted region established by a particular RFID-enabled light bulb 110a, 110b, 110c. In at least one implementation, an RFID reader's antenna may be oriented such that the antenna is substantially perpendicular to the ceiling of a retailer's store. In this implementation, or other implementations, the RFID reader's antenna may establish an interrogation range that spans a conical region 118a, 118b that is approximately 35-45 degrees away from a center axis 119 of the RFID reader's antenna.

In some implementations, there may be certain RFID tags 130a, 130b, 130d that may reside within range of a single RFID reader. For instance, RFID tags 130a, 130b, 130d may only be detected by RFID reader 115a. However, there may also be instances where a particular RFID tag resides in particular location where the RFID tag can be detected by multiple readers. For instance, RFID tag 130c may reside in a particular location where RFID tag 130c may be detected by both RFID reader 115a and RFID reader 115b. Accordingly, one aspect of the present disclosure may facilitate detection of duplicate RFID tag reads in order to ensure that inventory is tracked accurately.

Figure 2:
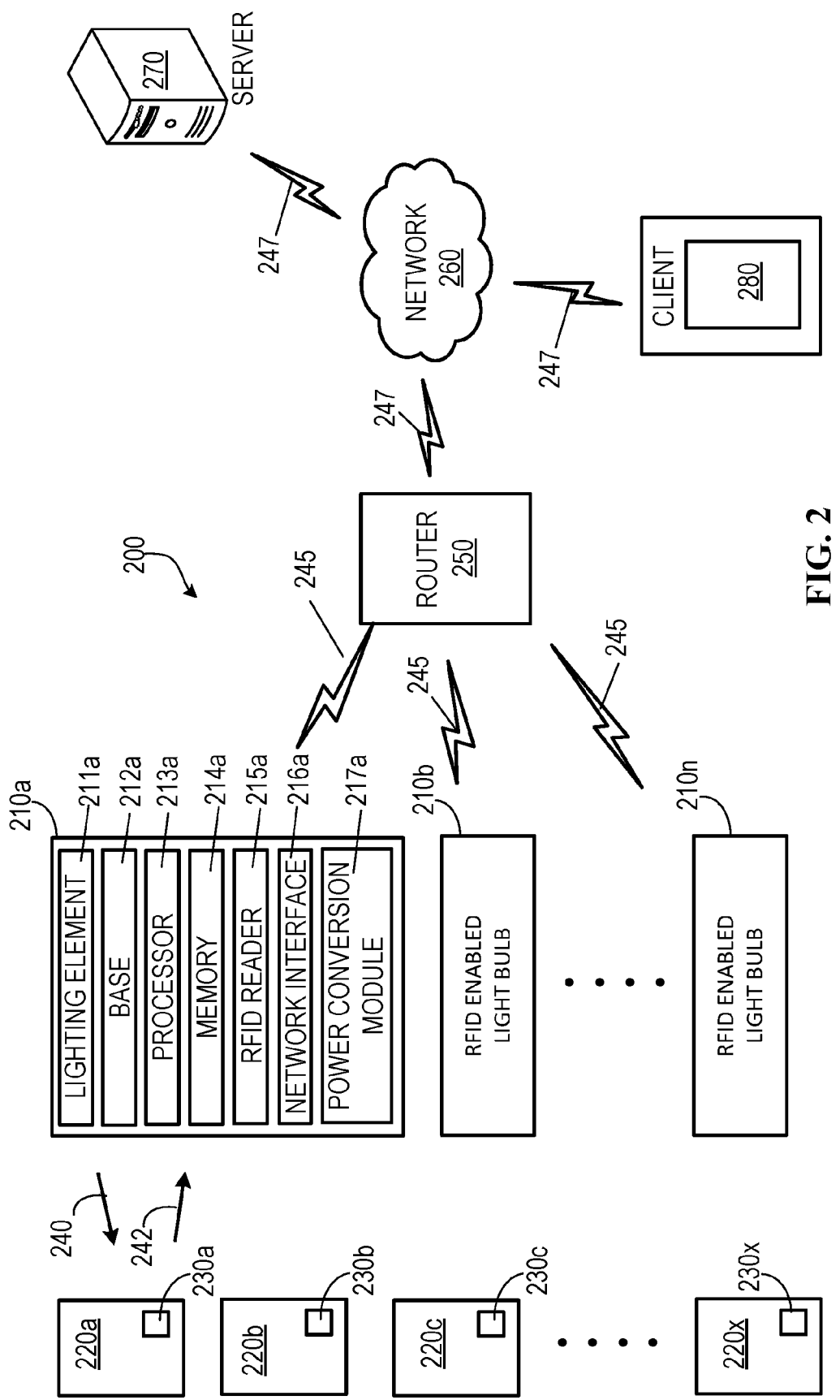
FIG. 2 is a block diagram showing an example of a system that may track inventory in real-time using an RFID-enabled light bulb.

FIG. 2 is a block diagram showing an example of a system 200 that may track inventory in real-time using an RFID-enabled light bulb. The system 200 may include, for example, one or more RFID-enabled light bulbs 210a, 210b, . . . 210n, one or more inventory items 220a, 220b, 220c, . . . 220x, one or more RFID tags 230a, 230b, 230c, . . . 230x, a router 250, a network 260, a server 270, and a client device 280.

In one implementation, system 200 may include an RFID-enabled light bulb 210a. The RFID-enabled light bulb 210a may include, for example, a lighting element 211a, a base 212a, a processor 213a, a memory 214a, an RFID reader 215a, a network interface 216a, and a power conversion module 217a. Each RFID-enabled light bulb 210a, 210b, . . . 210n may utilize one of variety of different lighting elements 211a depending upon the type of light bulb used to implement each respective RFID-enabled light bulb 210a, 210b, . . . 210n. For example, the lighting element 211a may be comprised of mercury gas, a wire filament, a light emitting diode, or the like. A base 212a may be coupled to a case that encloses the lighting element 211a. The base 212a may include a set of one or more electrical contacts that may be configured to mate with an electrical outlet. Thus, a connection established between at least portion of the base 212a and an electrical socket may establish a circuit that can facilitate power delivery to the lighting element 211a.

The processor 213a may be configured to execute computer program instructions stored in memory 214a in order to facilitate operation of RFID-enabled light bulb 210a. For instance, processor 213a may execute instructions that initiate a command to the RFID reader 215a to begin an RFID tag interrogation cycle by broadcasting an interrogation signal into an interrogation range that may include an RFID tag. In some aspects, an interrogation cycle may include the broadcast of a single interrogation signal. Alternatively, an interrogation cycle may comprise a plurality interrogation signals. The initiation of a particular interrogation cycle may be based, for example, on the expiration of a predetermined amount of time. For example, processor 213a may instruct RFID reader 215a to initiate an interrogation cycle every minute, every 5 minutes, every 10 minutes, or the like.

The memory 214a may be provided store information that is necessary for the RFID-enabled light bulb 210a to function. Such information may include, for example, computer program instructions that can be executed by processor 213a in order to realize the functionality described herein. Memory 214a may also be configured to store data associated with each RFID tag 230a, 230b, 230c, . . . 230x that may be detected during a particular interrogation cycle. Memory 214a may be sized appropriately to be sufficient to store data associated with a set of RFID tags 230a, 230b, 230c, . . . 230x detected during an interrogation cycle that only includes a single interrogation signal broadcast. Alternatively, memory 214a may be sized appropriately in order to accommodate storage of data associated with a set of RFID tags 230a, 230b, 230c, . . . 230x that has been obtained during an interrogation cycle that includes the broadcast of multiple interrogation signals.

Processor 213a may execute instructions that initiate a command to instruct the network interface 216a to transmit a set of data associated with one or more RFID tags 230a, 230b, 230c, . . . 230x that may be stored in memory 214a to a router 250 via a short range communication link 245. The short range communications link 245 may include a radio interface between the network interface 216a and router 250. For example, the radio interface may comprise Bluetooth, WiFi, or the like. Alternatively, or in addition, network interface 216a may be configured to transmit a set of data associated with one or more RFID tags 230a, 230b, 230c, . . . 230x that may be stored in memory 214a to a router 250 via one or more wired network connections.

The RFID reader 215a may be an RFID reader module that includes at least an antenna and a transceiver. The RFID reader 215a may be configured to broadcast an interrogation signal 240 using the antenna in an attempt to detect data associated with a set of one or more RFID tags 230a, 230b, 230c, . . . 230x. Each respective RFID tag 230a, 230b, 230c, . . . 230x may correspond to a particular inventory item 220a, 220b, 220c, . . . 220x. The interrogation signal 240 may be a radio wave that is configured to provide power to an RFID tag 230a, 230b, 230c, . . . 230x. In response to a received interrogation signal 240, each RFID tag 230a, 230b, 230c, . . . 230x within range of the interrogation signal 240 may power-on and then transmit a response message 242 that includes data associated with the RFID tag back to the RFID reader 215a, 215b, . . . 215n. The RFID reader 215a may use its integrated transceiver to receive the data transmitted by each respective RFID tag 230a, 230b, 230c, . . . 230x. The response message 242 may include data such as, for example, a data string that includes information that may (1) identify the particular inventory item 220a, 220b, 220c, . . . 220x that may be associated with each corresponding RFID tag 230a, 230b, 230c, . . . 230x and/or (2) identify the corresponding RFID tag 230a, 230b, 230c, . . . 230x. For instance, the data included within response message 242 may include a serial number, a universal product code, an RFID identifier, or the like.

The RFID reader 215a may be configured to store the data associated with response message 242 in memory 214a. In some instance, RFID-enabled light bulb may use network interface 216a to transmit the response message 242 data to a server 270 without decoding the data. Alternatively, the RFID reader 215a may include a microprocessor that may be used to decode the data received from each respective RFID tag 230a, 230b, 230c, . . . 230x and to extract a serial number, a universal product code, an RFID tag identifier, or the like. In such instances, RFID reader 215a may only store the extracted data in memory 214a. Alternatively, or in addition, RFID reader 215a may utilize processor 213a in order to decode the data received from each respective RFID tag 230a, 230b, 230c, . . . 230x and to extract a serial number, a universal product code, an RFID identifier, or the like. In such instances, RFID reader 215a may only store the extracted data in memory 214a.

The RFID reader 215a may be integrated with a light bulb in a variety of different ways. For instance, an RFID reader 215a may be coupled to an external portion of a light bulb 210a. Alternatively, the RFID reader 215a may be integrated within the light bulb's 210a housing that includes the base 212a having electrical contacts for establishing an electrical connection in a light bulb socket. Each RFID reader 215a may be assigned a particular device identifier. The device identifier may uniquely identify the RFID reader 215a. In some instances, the device identifier of an RFID reader 215a may be stored in memory 214a.

Each RFID-enabled light bulb 210a may also include a power conversion module 217a. The power conversion module 217a may be configured to covert AC power received from the light bulb socket into DC power. RFID-enabled light bulb 210a may then use the DC power output by the power conversion module to power the processor 213a, the memory 214a, the RFID reader 215a, and the network interface 216a. In some implementations, however, an RFID-enabled light bulb such as RFID-enabled light bulb 210b may not include a power conversion module. In such instances, an RFID-enabled light bulb 210b may utilize a battery to power one or more components of RFID-enabled light bulb 210b.

Each RFID tag 230a, 230b, 230c, . . . 230x may be either a passive or active RFID tag. For instance, a passive RFID tag may not include an independent power source. In such instances, a passive RFID tag may be dormant until an interrogation signal 240 is received from an RFID reader such as, for example, RFID reader 215a. Upon receipt of an interrogation signal 240, the RFID tag such as 230a may convert the received interrogation signal 240 into a source of power and then transmit a response message 242 that includes data associated with the RFID tag back to the RFID reader 215a. Alternatively, or in addition, an active RFID tag that may include an independent power source. Such an active RFID tag may generally function in the same way as a passive RFID tag. However, the independent power source of an active RFID tag may allow the active RFID tag to transmit a response to an interrogation signal over greater distances.

During the course of obtaining inventory data, a system such as system 200 may utilize a plurality of n RFID readers to transmit interrogation signals to detect the presence of a plurality of x RFID tags, where n and x are positive, non-zero integers. Such a system may result in tens, to hundreds, or even thousands of responses from RFID tags to a single broadcast of an interrogation signal 240. The RFID reader 215a may be configured to receive each of these response messages 242 from each of the x number of RFID tags within the RFID reader's 215a interrogation range, and store the data associated with each of the response messages 242 in memory 214a. In some instances, the data included within the response message 242 may directly correspond to a particular inventory item 220a that is associated with a particular RFID tag 230a. The data associated with each response message 242 may comprise, for example, an RFID tag identifier, a serial number, a universal product code and/or the like. Accordingly, the data stored in memory 214a after a single broadcast of an interrogation signal may include a particular data item for each of x detected response messages 242 from each of x RFID tags within a particular interrogation range of a particular RFID reader 215a. This set of data items from each of the x response messages may be referred to as a set of inventory data. RFID reader 215a, or processor 213a, may associate a timestamp with each set of inventory data. The timestamp may be indicative of the time the RFID reader 215a broadcast an interrogation signal 240 that resulted in the detection of the RFID tags that returned response messages on which the set of inventory data is based. Thus, in this manner, the RFID-enabled light bulb 210a may obtain real time inventory data for items residing within a retailer's store.

The network interface 216a may be configured to forward the data that the RFID reader 215a obtains from received responses messages 242 to a server 270. For instance, the network interface 216a may access a particular set of inventory data stored in memory 214a that is associated with the most recent time stamp. Then, the network interface 216a may forward the set of inventory data to a router 250 using one or more wired, or wireless, communication links 245. Router 250 may then relay the set of inventory to a cloud-based server 270 via a network 260. The router 250 and cloud-based server 270 may each connect to network 260 via one or more wired, or wireless, communication links 247. The network 260 may include any number of one or more public or private networks such as, for example, for example, a LAN, WAN, 3G Network, 4G Network, the Internet, or the like. The server 270 may use the received set of inventory data in order to update a retailer's inventory database. The network interface 216a may transmit each set of inventory data stored in memory 214a, as described above.

Client device 280 may be a device used by one or more end users in order to interact with server 270. For instance, the client 280 may be utilized by a retailer in order to access and review the retailer's real-time inventory list. Alternatively, or in addition, the client 280 may be utilized by any user who may connect to network 260 in order to review a real-time inventory list associated with a particular retailer.

Client 280 may also be used by a retailer to perform registration of each RFID reader 215a, 215b, . . . 215n at the time of installation of the RFID-enabled light bulbs 210a, 210b, . . . 210n in the retailer's store. For instance, at the time of installation, a client device 280 may be used in order to obtain a device identifier associated with a particular RFID reader 215a. The device identifier may be obtained, for example, by a retailer using client device 280 to transmit a request for the device identifier to the RFID-enabled light bulb 210a. Alternatively, client 280 may include a near-field communication module that enables the client device 280 to detect a device identifier assigned to a particular RFID reader 215a when the client device 280 is physically moved within range of RFID reader 215a.

Alternatively, or in addition, the retailer may use client device 280 in order to associate a particular location with each RFID reader 215a, 215b, . . . 215n. The location may include, for example, the address of the retailer's store. Alternatively, or in addition, the location may be described in a more specific manner. For instance, the location may indicate whether a particular RFID reader 215*a* is installed in the front room or back room of the retailer's store. Alternatively, or in addition, the location information may indicate a particular shelving unit(s) 105 that fall within a particular RFID reader's 215*a* interrogation range. Other types of location information may be associated with an RFID reader 215*a*. Client device 280 may then communicate the RFID reader 215*a* device identifier and the location to the server 270. Server 270 may store the RFID reader 215*a* device identifier and location information in an RFID reader location database.

Figure 3:
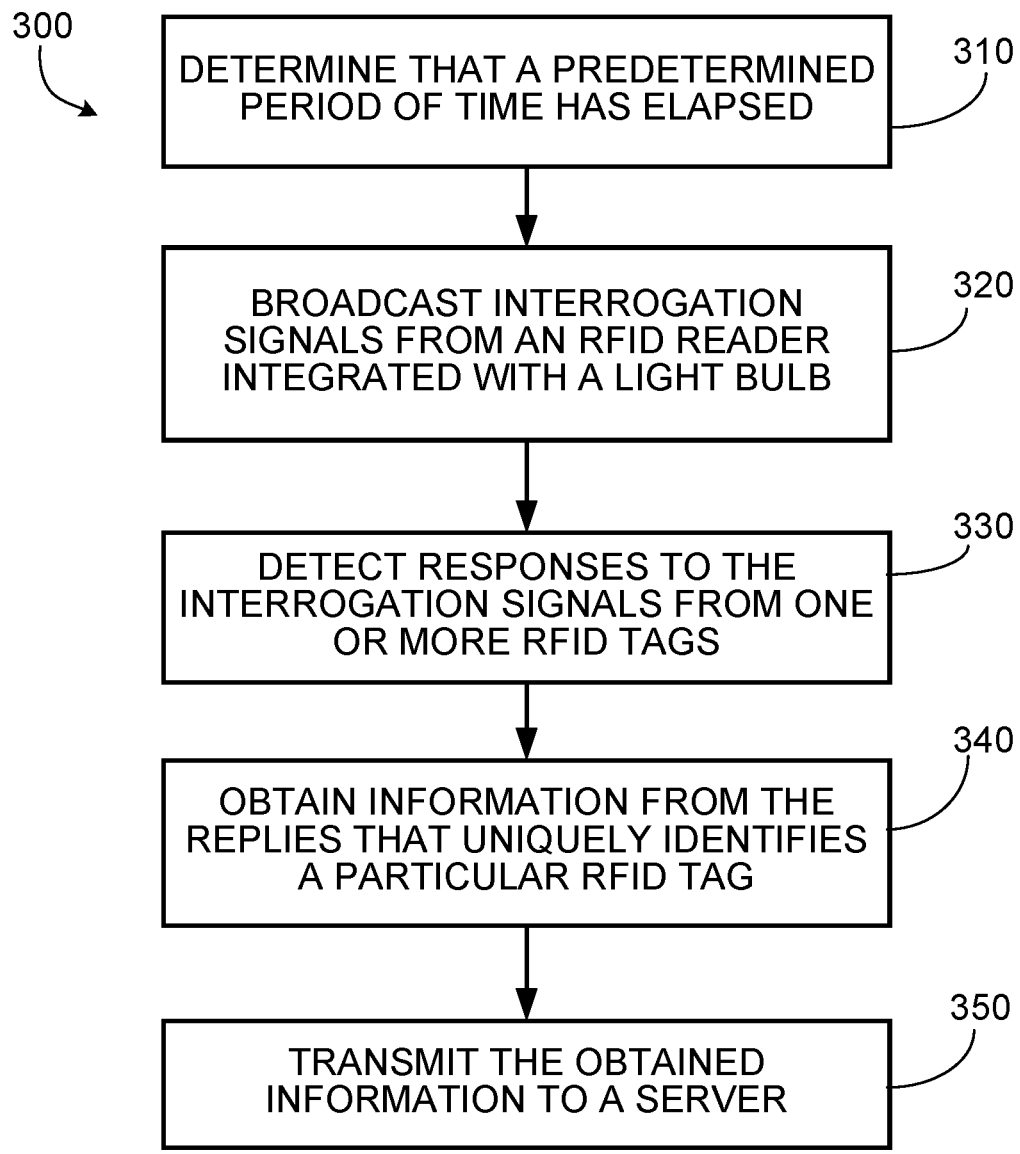
FIG. 3 is a flowchart of an example of a process that may obtain real time inventory information using an RFID-enabled light bulb.

FIG. 3 is a flowchart of an example of a process 300 that may obtain real time inventory information using an RFID-enabled light bulb 210*a*.

An RFID-enabled light bulb 210*a* may be configured to periodically broadcast interrogation signals 240 in response to the expiration of predetermined time period. For instance, a retailer may configure each of the RFID-enabled light bulbs installed in the retailers store to broadcast interrogation signals every minute, every 5 minutes, every 10 minutes, every 15 minutes, or the like. Processor 213*a* may be configured to monitor a counter that tracks the passing of time. The process 300 for obtaining inventory information using the RFID-enabled light bulb may begin at step 310 when the processor 213*a* determines that a predetermined time period has expired. In response to the determination that a predetermined time period has expired, the processor 213*a* may command the RFID reader 215*a* to broadcast 320 an interrogation signal 240 from the RFID reader 215*a* that is integrated with the RFID-enabled light bulb 210*a*. The interrogation signal 240 may include a radio wave that may be sufficient to power an RFID tag 230*a* to transmit a response message 242.

Each RFID tag 230*a*, 230*b*, 230*c*, . . . 230*x* that falls within an interrogation range of an RFID reader 215*a* may receive the interrogation signal 240. The interrogation signal 240 may be of sufficient strength to power-on one or more RFID tags within the interrogation range. Once powered-on, an RFID tag such as RFID tag 230*a* may transmit a response message 242 that includes data associated with an RFID tag 230*a* that corresponds to a particular inventory item 220*a*. The data included within response message 242 may include at least, for example, an RFID tag identifier, a serial number that corresponds to an inventory item, a universal product code that corresponds to an inventory item 220*a*, and/or the like. RFID reader 215*a* may be configured to detect 330 response messages 242 transmitted from a powered-on RFID tag 230*a*. RFID-enabled light bulb 210*a* may be configured to obtain 340 one or more of particular types of information included within the received response message 242 such as, for example, the RFID tag identifier, serial number, universal product code, or the like from the detected response message. The obtained data may be stored in memory 214*a*.

RFID-enabled light bulb 210*a* may be configured to transmit 350 one or more sets of inventory data stored in memory 214*a* through network 260 to the server 270 using the network interface 216*a*. RFID-enabled light bulb 210*a* may be configured to transmit inventory item information in a variety of different ways. For instance, RFID-enabled light bulb 210*a* may be configured to transmit a set of inventory data that is detected in response to a single broadcast of interrogation signal 240. Alternatively, RFID-enabled light bulb 210*a* may be configured to aggregate multiple sets of inventory data that are each detected in response to multiple broadcasts of interrogation signal 240. In such instances, one or more components of RFID-enabled light bulb may analyze the aggregated data to eliminate duplicate RFID tag reads, and then transmit a de-duplicated set of RFID tag reads to server 270.

Aggregating multiple sets of inventory data may be particularly beneficial in an environment that may include a predetermined amount of noise, or interference. In such environments, an RFID tag reader 215*a* may not be able to detect every response message 242 sent by each RFID tag within the interrogation range. Thus, utilizing multiple broadcasts of interrogation signal 240, aggregating the response messages 242 associated with those reads, and analyzing the aggregated data to eliminate duplicate reads may facilitate increased accuracy in inventory data counts by providing an RFID reader with multiple opportunities to detect all available RFID tags residing within an RFID reader's interrogation range.

RFID-enabled light bulb 210*a* may include additional information with each set of inventory data that is transmitted 350 to the server 270. For instance, RFID reader 215*a* may also transmit an RFID reader's device identifier with each set of inventory data that is transmitted to server 270. Alternatively, or in addition, an RFID-enabled light bulb 210*a* may also transmit a timestamp that is associated with each set of inventory data this transmitted to server 270. The timestamp may be indicative of the time the RFID reader 215*a* broadcast an interrogation signal 240 that resulted in the detection of the RFID tags that returned response messages on which the set of inventory data is based.

Figure 4:
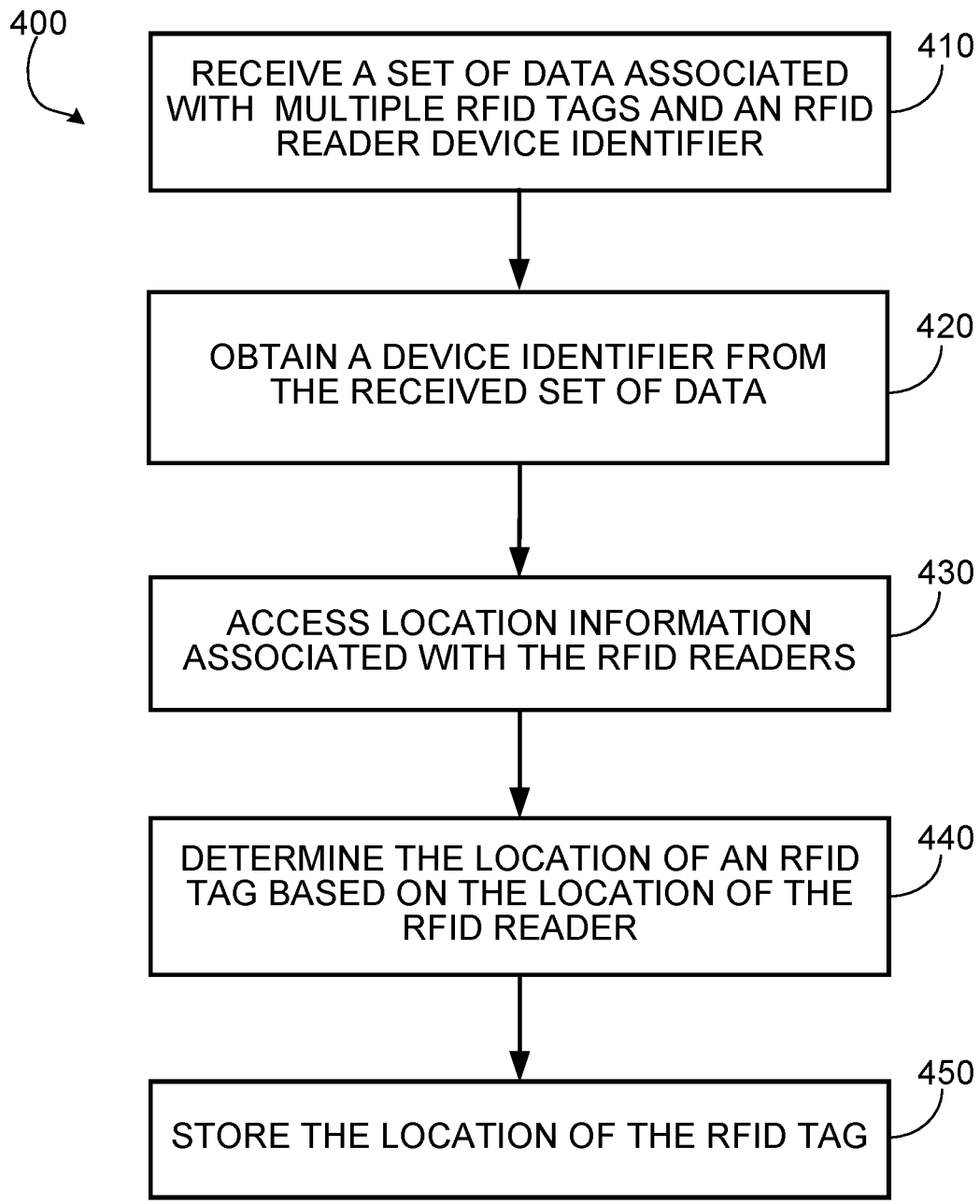
FIG. 4 is a flowchart of an example of a process that may be utilized by a cloud-based server in order to determine the location of an inventory item.

FIG. 4 is a flowchart of an example of a process that may be utilized by a cloud-based server 270 in order to determine the location of an inventory item 220*a*, 220*b*, 220*c*, . . . 220*x*.

A server such as, server 270, may be configured to receive 410 a set of inventory data that has been detected and transmitted by each RFID reader 215*a*, 215*b*, . . . 215*n*. Alternatively, or in addition, the data received at 410 may also include an RFID reader device identifier. Server 270 may be configured to determine the location of a particular inventory item 220*a*, 220*b*, 220*c*, . . . 220*x* from a set of multiple inventory data items using the RFID device identifier associated with set of inventory data.

Server 270 may be configured to obtain 420 an RFID reader device identifier associated with a set of inventory data received from an RFID reader such as, for example, RFID reader 215*a*. The server 270 may then access 430 a database that includes location information associated each RFID reader 215*a*, 215*b*, . . . 215*n* of system 200. The database of location information may be indexed based on, for example, the RFID reader device identifiers. The server 270 may then use the obtained RFID device identifier in order to retrieve 440 the location of the RFID reader 215*a* that corresponds to the extracted RFID device identifier. The location of an RFID reader device identifier may include, for example, the location of a particular retailer's store. Alternatively, or in addition, the location of an RFID device identifier may be a more specific location of an RFID reader 215*a* within a particular retailer's store.

Once the location of the RFID reader device identifier received in step 410 is determined, the server 270 may assign the location of the RFID reader to each particular inventory data item within the set of received inventory data that was previously received at 410. This may result in an association that is created between each of the received RFID tag identifiers and a particular location of the RFID reader that detected the corresponding RFID tag. The server 270 may then store 450 this associated data in an inventory database for each inventory data item to indicate that particular inventory item 220*a* resides within the interrogation region of a particular RFID reader 215a. Alternatively, server 270 may store just the determined location in the inventory database for each item in the received set of inventory data. Such inventory item location information may then be made accessible to one or more client devices 280.

Figure 5:
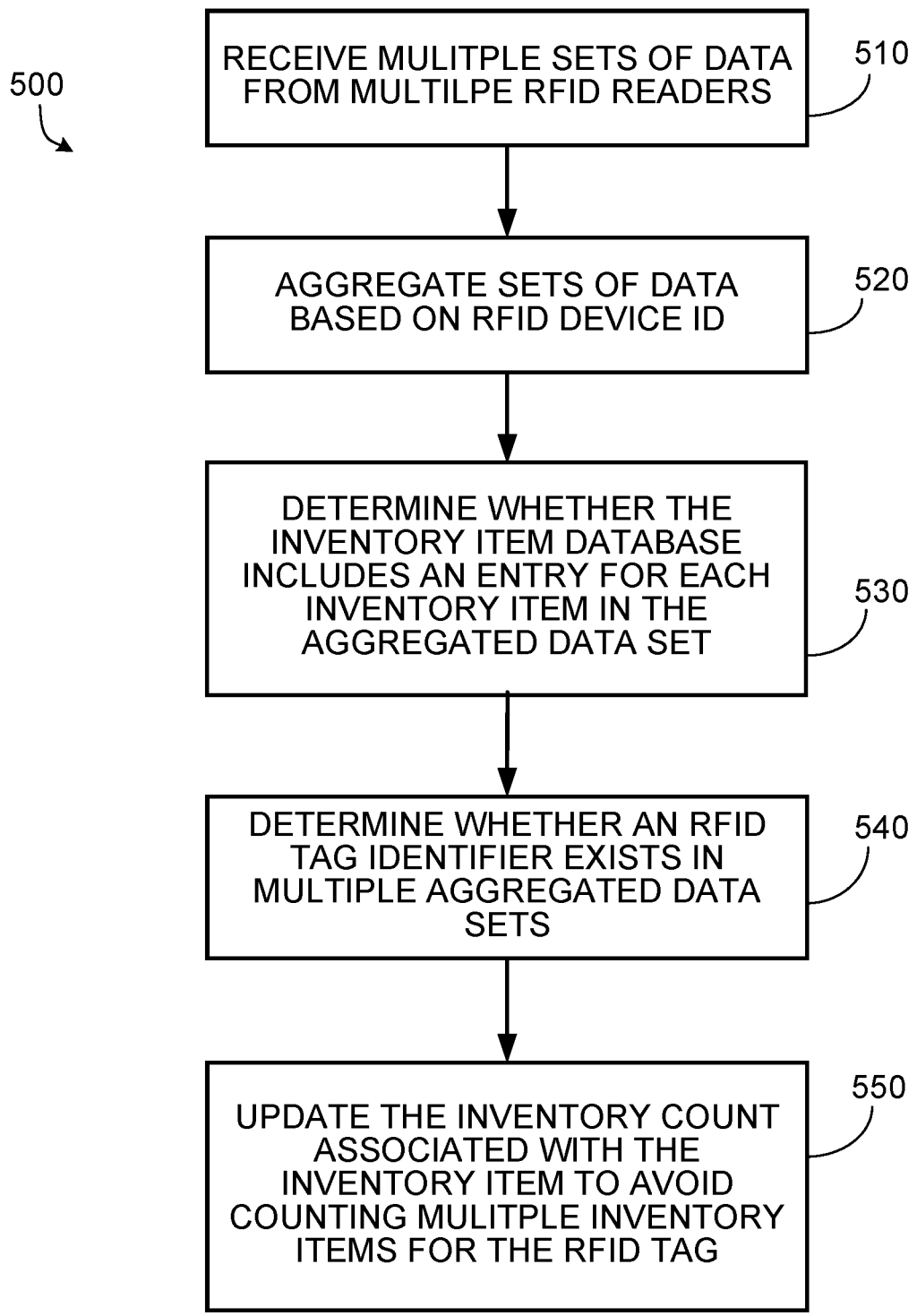
FIG. 5 is a flowchart of an example of a process that may be utilized by a cloud-based server to detect duplicate reads of an RFID tag.

FIG. 5 is a flowchart of an example of a process that may be utilized by a cloud-based server 270 to detect duplicate reads of an RFID tag 230a, 230b, 230c, . . . 230x.

The process 500 may begin when the server 270 may receive 510 multiple sets of inventory data from multiple different RFID readers 215a, 215b, . . . 215n. Server 270 may separately store the received sets of inventory data from each RFID reader 215a, 215b, . . . 215n in separate memory locations based on RFID reader device identifier at the time of receipt of the inventory data. Alternatively, or in addition, the each of the sets of received inventory data may be stored based on the timestamp received from the RFID-enabled light bulb.

At predetermined intervals, server 270 may aggregate all of the data received for each particular RFID reader 215a, 215b, . . . 215n on an individual basis. The predetermined intervals may be, for example, every 30 minutes, every hour, every 2 hours, every 3 hours, or the like. For each inventory data item in the set of inventory data, the server 270 may obtain an RFID tag identifier, serial number, universal product code, and/or one or more other inventory item identifiers from the received set of inventory data. Alternatively, server 270 may obtain a RFID tag identifier from the received set of inventory data for reach inventory data item, and use the obtained RFID tag identifier to retrieve a serial number, universal code, and/or other product identifier associated that corresponds to the RFID tag identifier.

Based on the aggregated data for each RFID reader device identifier, server 270 may determine 530 whether the inventory item database maintained by server 270 includes a record for each inventory item in the aggregated set of inventory items. This may include, for example, creating a new record in the inventory item database based on the determination that the aggregated set of inventory data includes a serial number, universal product code, or other inventory item identifier that indicates the presence of an inventory item that is not listed in the inventory item database. Alternatively, this may include, for example, deleting a record in the inventory item database based on the determination that the inventory item database includes a serial number, universal product code, or other inventory item identifier that is not included within the aggregated set of inventory item data.

Subsequent to aggregating the data from each of the multiple RFID readers 215a, 215b, . . . 215n, server 270 may include a plurality of aggregated data sets, wherein each of the aggregated data sets may be associated with a particular RFID reader device identifier. Server 270 may then analyze each of these aggregated data sets in order to determine 540 whether a particular RFID tag identifier exists in more than one aggregated data set. If it is determined that a particular RFID tag identifier exists in more than one aggregated data set, the server 270 may be configured to update the inventory count associated with the inventory item to indicate that only a single inventory item was detected for that RFID tag identifier. In other words, when different RFID-enabled light bulbs detect the same tag, the server 270 performs deduplication to ensure that each inventory item is not over-counted in the inventory records.

Figure 6:
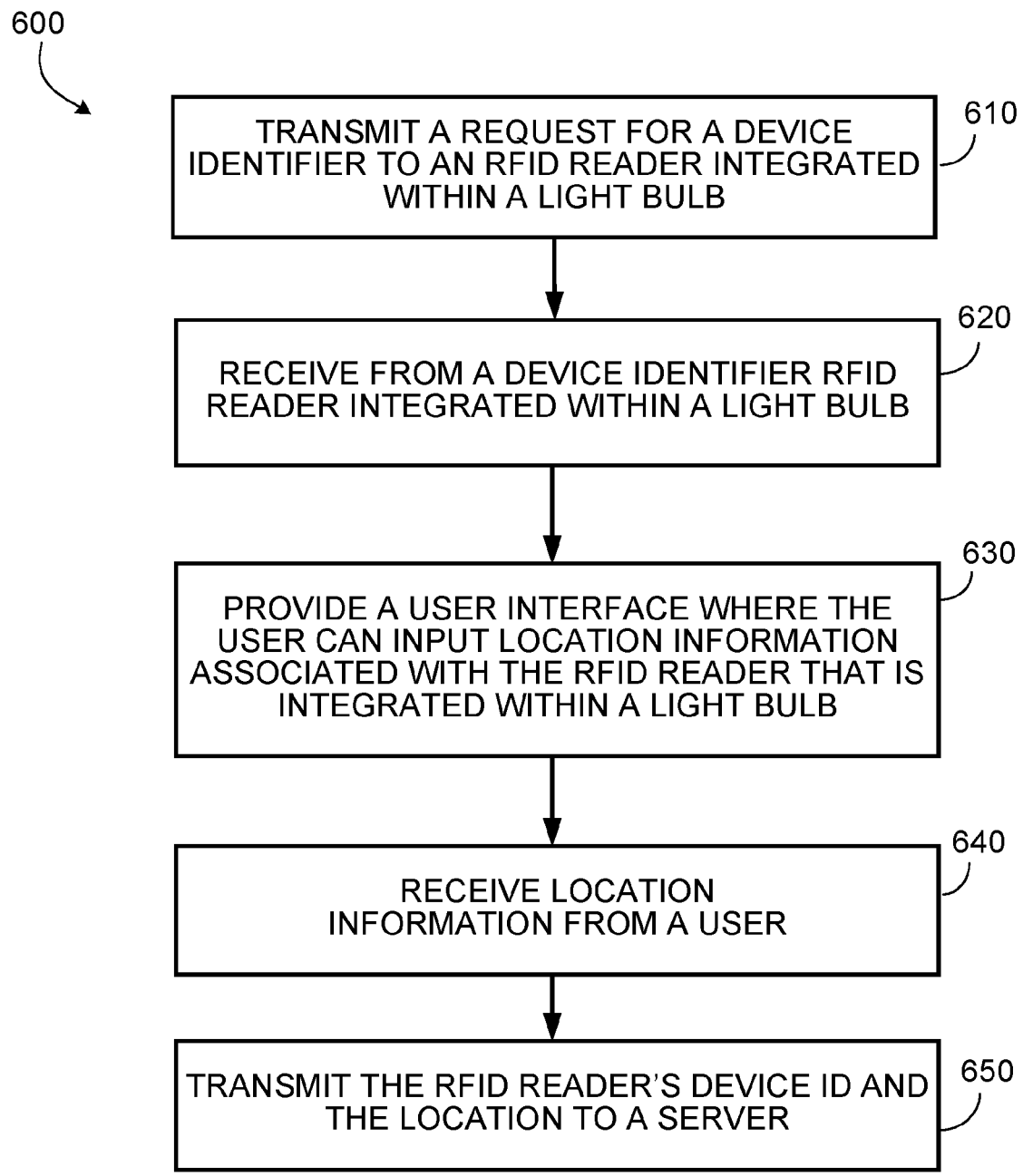
FIG. 6 is a flowchart of an example of a process for registering an RFID reader integrated with a light bulb with a cloud-based server.

FIG. 6 is a flowchart of an example of a process for registering an RFID reader 215a, 215b, . . . 215n that is associated with an RFID-enabled light bulb 210a, 210b, . . . 210n with a cloud-based server 270.

A retailer of a store may easily install a plurality of RFID-enabled light bulbs 210a, 210b, . . . 210n in the retailer's store. For instance, the retailer may purchase a plurality of RFID-enabled light bulbs, remove the ordinary light bulbs that were previously illuminating the retailer's store, and then insert each of the purchased RFID-enabled light bulbs into the retailer's existing light sockets. The retailer may then register each of the RFID readers associated with each RFID-enabled light bulb with server 270 once the retailer has installed a set of one or more RFID-enabled light bulbs. The retailer may register each of the installed RFID readers using a client device such as client 280.

Registration of a retailer's RFID-enabled light bulb may begin with the retailer using an application running on client device 280 to instruct the client device 280 to transmit 610 a request to at least one of the RFID-enabled light bulbs installed in the retailer's store. The request may include, for example, a request for a device identifier of the RFID reader associated with the RFID-enabled light bulb. Client device 280 may receive 620 a response from the RFID-enabled light bulb that includes a device identifier that identifies the particular RFID reader associated with the particular RFID-enabled light bulb. At 630, the application running on client device 280 may provide an interface that may be configured to receive an input from a user related to the location of the RFID reader. For instance, the user may provide an indication as to whether the RFID reader resides in the front room of the store, or the backroom of the store. Other location information may be provide. In some instances, the application may merely provide a text input box that may allow a user to manually type in a particular location associated with the device. Alternatively, the application may provide a user with a drop down box that may provide a plurality of location options to the user as suggested locations.

The mobile application running on client device 280 may receive 640 the location information that is input the by user. Upon receipt of the location information associated with a particular RFID reader, the mobile application instruct the client device 280 to transmit the RFID reader's device identifier and the location to the server 270. Server 270 may store the received information in a location database that includes location information associated with each RFID reader 215a, 215b, . . . 215n of system 200. This location database may be subsequently accessed in order to determine the corresponding location of an RFID tag that has been directed by a particular RFID reader.

In situations in which the systems discussed here collect personal information about users, or may make use of personal information, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term data "processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps may be provided, or steps may be eliminated, from the described processes. Accordingly, other implementations are within the scope of the following claims.

What is claimed is:

1. A device comprising:
    a light bulb housing having a base with electrical contacts for establishing an electrical connection in a light bulb socket;
    a lighting element;
    an RFID reader module integrated with the light bulb housing, the RFID reader module comprising an antenna, a transmitter for generating RFID interrogation signals, and a receiver for processing received replies to interrogation signals;
    a network interface configured to provide a connection to a computer network;
    one or more processors; and
    one or more machine-readable storage devices storing instructions that, when executed by the one or more processors, cause the one or more processors to perform instructions comprising:
        causing the RFID reader module to transmit interrogation signals;
        causing the RFID reader module to detect replies from multiple RFID tags that each include information that uniquely identifies a particular item associated with each respective RFID tag;
        obtaining the information that uniquely identifies a particular RFID tag from each reply; and
        transmitting the obtained information over the connection using the network interface.

2. The device of claim 1, wherein the RFID reader module, the network interface, the one or more processors, and the one or more machine-readable storage devices each reside within the light bulb housing.

3. The device of claim 1, wherein the RFID reader module is assigned a device identifier that is stored in the one or more machine-readable storage devices.

4. The device of claim 3, wherein the operations further comprise:
    associating the unique device identifier with the obtained information; and
    transmitting the obtained information and unique device identifier over the connection to the computer network using the network interface.

5. The device of claim 1, further comprising a power conversion module to convert AC power received from a light bulb socket to DC power;
    wherein the operations further comprise using the DC power output by the power conversion module to power the RFID reader, the network interface, the one or more processors, and the one or more machine-readable storage devices.

6. The device of claim 1,
    wherein the lighting element is oriented to direct light into a lighted region,
    wherein the antenna is oriented to direct the interrogation signals to the lighted region and receive replies from the RFID tags located in the lighted region.

7. The device of claim 1,
    wherein the antenna directs interrogation signals to and receive replies from a conical region that spans a range of 35 to 45 degrees away from a central axis of the light bulb.

8. The device of claim 1, wherein the operations further comprise:
    determining that a predetermined interval of time has expired; and
    in response to a determination that a predetermined interval of time has expired, causing the RFID module to transmit interrogation signals in response to the expiration of a predetermined interval of time.

9. The device of claim 1, wherein transmitting the obtained information over the connection using the network interface further comprises:
    determining that a predetermined interval of time has expired; and
    in response to a determination that a predetermined interval of time has expired, causing the network interface to transmit the obtained information over the connection.

10. The device of claim 1, the obtained information that uniquely identifies a particular RFID tag from each reply may include an RFID tag identifier, a serial number, or a universal product code.

11. A system comprising:
    one or more computers and one or more computer-readable storage devices storing instructions that, when executed by the one or more computers, cause the one or more computers to perform operations comprising:
        storing information that indicates locations of RFID readers;
        receiving, over a computer network, a set of data from each of multiple RFID readers that are each integrated with a respective light bulb, wherein each set of data received from each of the multiple RFID readers includes (i) a device ID of the RFID reader, (ii) a timestamp, (iii) information that indicates a set of RFID tags detected by the RFID reader that was obtained by interrogating the RFID tags;

accessing location data indicating locations corresponding to the RFID readers that are integrated with the respective light bulbs;

for one or more of the device IDs, determining the location of the RFID reader corresponding to the device ID based on the location data;

determining, for one or more of the RFID tags, a location of the RFID tag based on the determined locations of one or more RFID readers that detected the RFID tag; and storing data indicating the location of the one or more RFID tags.

12. The system of claim 11, the operations further comprising:

receiving a request for the location of a particular item over the computer network; and providing, based on the stored data indicating location of the one or more RFID tags, data indicating the location of the particular item.

13. The system of claim 12, the operations further comprising:

authenticating the received request for the location of a particular item prior to providing data indicating the location of the particular item.

14. The system of claim 11, the operations further comprising:

receiving, over a computer network, multiple sets of data from a particular RFID reader, wherein the multiple sets of data were respectively transmitted by the RFID reader after each of a plurality of first predetermined time intervals, wherein each set of data includes (i) the device ID of the particular RFID reader, (ii) information that indicates a set of RFID tags detected by the RFID reader that was obtained by interrogating the RFID tags;

aggregating the received multiple sets of data into an aggregated set of data, wherein the aggregation is initiated based upon the expiration of a second predetermined time interval that spans multiple first predetermined time intervals;

updating a database of inventory items based on the aggregated set of data; and storing an inventory count for at least one item in the database of inventory items in response to the database update.

15. The system of claim 11, the operations further comprising:

receiving, over a computer network, multiple sets of data from multiple RFID readers that were transmitted by each RFID reader in accordance with the expiration of each of a series of first predetermined time intervals, wherein each set of data includes (i) a device ID of the RFID reader, (ii) a timestamp for the set of data, (iii) information that indicates a set of RFID tags detected by the RFID reader that was obtained by interrogating the RFID tags;

aggregating, based on device ID of the RFID reader, the received multiple sets of data into a plurality of aggregated sets of data that are each associated with a particular RFID reader, wherein the aggregation is initiated based upon the expiration of a second predetermined time interval that spans multiple first predetermined time intervals;

updating a database of inventory items based on each of the aggregated sets of data; and storing an inventory count for at least one item in the database of inventory items in response to the database update.

16. The system of claim 15, the operations further comprising:

determining that two or more aggregated data sets generated in response to the expiration of the second predetermined time interval include the same information that identifies an RFID tag; and updating the inventory count associated with the inventory item to indicate that only a single inventory item was detected.

17. The system of claim 11, wherein receiving, over a computer network, the set of data from each of multiple RFID readers that are each integrated with a respective light bulb comprises:

receiving, over a computer network, a set of data from an RFID reader that is located within a base of a light bulb.

18. The system of claim 11, wherein the information that information that indicates a set of RFID tags includes an RFID identifier for each RFID tag detected by an RFID reader.

19. A method, comprising:

transmitting, by an RFID reader module integrated with a light bulb housing, interrogation signals;

detecting, by the RFID reader module integrated with the light bulb housing, replies from multiple RFID tags that each include information that uniquely identifies a particular item associated with each respective RFID tag;

obtaining, by the RFID reader module integrated with the lightbulb housing, the information that uniquely identifies a particular RFID tag from each reply; and transmitting the obtained information over a connection using a network interface integrated with the light bulb housing.

20. A method, comprising:

storing information that indicates locations of RFID readers;

receiving, over a computer network, a set of data from each of multiple RFID readers that are each integrated with a respective light bulb, wherein each set of data received from each of the multiple RFID readers includes (i) a device ID of the RFID reader, (ii) a timestamp, (iii) information that indicates a set of RFID tags detected by the RFID reader that was obtained by interrogating the RFID tags;

accessing location data indicating locations corresponding to the RFID readers that are integrated with the respective light bulbs;

for one or more of the device IDs, determining the location of the RFID reader corresponding to the device ID based on the location data;

determining, for one or more of the RFID tags, a location of the RFID tag based on the determined locations of one or more RFID readers that detected the RFID tag; and storing data indicating the location of the one or more RFID tags.

* * * * *